(12) United States Patent
Li et al.

(10) Patent No.: US 8,806,641 B1
(45) Date of Patent: Aug. 12, 2014

(54) SYSTEMS AND METHODS FOR DETECTING MALWARE VARIANTS

(75) Inventors: Yi Li, Sichuan (CN); Xiao Dong Tan, Beijing (CN); Kai Xiao, Sichuan (CN)

(73) Assignee: Symantec Corporation, Mountain View, CA (US)

( * ) Notice: Subject to any disclaimer, the term of this patent is extended or adjusted under 35 U.S.C. 154(b) by 134 days.

(21) Appl. No.: 13/297,244

(22) Filed: Nov. 15, 2011

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/56* | (2013.01) |

(52) U.S. Cl.
CPC ............ *G06F 21/564* (2013.01); *G06F 21/563* (2013.01); *G06F 21/562* (2013.01)
USPC .................. 726/24; 726/22; 726/23; 717/174

(58) Field of Classification Search
CPC ....... G06F 21/56; G06F 21/55; G06F 21/562; G06F 21/564; G06F 21/561
USPC ................................ 726/22–25; 717/174–178
See application file for complete search history.

(56) References Cited

U.S. PATENT DOCUMENTS

| | | | |
|---|---|---|---|
| 8,683,216 B2 * | 3/2014 | Harmonen ................... 713/188 |
| 2008/0250018 A1 * | 10/2008 | Geffner et al. ..................... 707/6 |
| 2009/0044024 A1 * | 2/2009 | Oberheide et al. ............ 713/188 |
| 2010/0192222 A1 * | 7/2010 | Stokes et al. ..................... 726/22 |
| 2011/0219450 A1 * | 9/2011 | McDougal et al. ............. 726/23 |
| 2011/0302654 A1 * | 12/2011 | Miettinen ........................ 726/23 |
| 2012/0017275 A1 * | 1/2012 | Harmonen ....................... 726/24 |
| 2012/0102568 A1 * | 4/2012 | Tarbotton et al. ............... 726/23 |
| 2013/0046763 A1 * | 2/2013 | Sinclair et al. ................ 707/737 |
| 2013/0067577 A1 * | 3/2013 | Turbin et al. .................... 726/24 |

* cited by examiner

*Primary Examiner* — Tae Kim
(74) *Attorney, Agent, or Firm* — ALG Intellectual Property, LLC

(57) ABSTRACT

A computer-implemented method for detecting malware variants may include (1) identifying an application package file including at least one class file, (2) identifying a set of metadata fields within the class file, (3) comparing the set of metadata fields within the class file with a set of metadata fields within a corresponding class file found in a known malware package to determine a similarity between the application package file and the known malware package, and (4) determining, based on the similarity between the application package file and the known malware package, that the application package file is a threat variant in a same threat family as the known malware package. Various other methods, systems, and computer-readable media are also disclosed.

20 Claims, 6 Drawing Sheets

SYSTEMS AND METHODS FOR DETECTING MALWARE VARIANTS

BACKGROUND

With the rise of mobile computing, consumers may now access the Internet from anywhere. Mobile computing devices such as cellular telephones, tablet computers, e-book readers, and the like have become a ubiquitous part of everyday life. However, the ability to access the Internet from these devices also brings the various dangers of the Internet to these devices. Untrusted sources for mobile applications may offer malicious applications for download. Furthermore, trusted sources, such as digital distribution platforms (or "application stores") for some mobile platforms, may sometimes inadvertently host malware. Additionally, malicious web pages may exploit vulnerabilities in web browser software that may allow malware to be downloaded to a user's mobile computing device.

Traditional anti-malware techniques may attempt to combat malware by searching application package files for specific strings and/or byte code sequences. However, these traditional techniques may be costly to perform on mobile platforms. Furthermore, these traditional techniques may be ineffective because malware authors may regularly modify their malware in an attempt to circumvent commonly employed static-string-based malware-detection mechanisms. Accordingly, the instant disclosure identifies a need for additional and improved systems and methods for detecting malware variants.

SUMMARY

As will be described in greater detail below, the instant disclosure generally relates to systems and methods for detecting malware variants by comparing class files in suspect application packages with class files in known malware families based on metadata stored in the class files. In one example, a computer-implemented method for detecting malware variants may include (1) identifying an application package file including at least one class file, (2) identifying a set of metadata fields within the class file, (3) comparing the set of metadata fields within the class file with a set of metadata fields within a corresponding class file found in a known malware package to determine a similarity between the application package file and the known malware package, and (4) determining, based on the similarity between the application package file and the known malware package, that the application package file is a threat variant in a same threat family as the known malware package.

The set of metadata fields within the class file may include any of a variety of information. For example, identifying the set of metadata fields within the class file may include identifying a number of constants in a constant pool of the class file. Additionally or alternatively, the set of metadata fields within the class file may include (1) a size of the class file, (2) a number of class types in the class file, (3) a number of fields in the class file, (4) a number of methods in the class file, (5) a total length of the methods in the class file, and/or (6) an average length of method names in the class file.

In some examples, comparing the set of metadata fields within the class file with the set of metadata fields within the corresponding class file may include (1) determining that the corresponding class file corresponds to the class file by comparing the class file to each class file within the known malware package and (2) determining that the corresponding class file is more similar to the class file than any other class file within the known malware package. Additionally or alternatively, comparing the set of metadata fields within the class file with the set of metadata fields within the corresponding class file may include (1) selecting a plurality of class files within the application package file to compare with a plurality of corresponding class files within the known malware package and (2) comparing the plurality of class files with the plurality of corresponding class files to determine the similarity of each class file within the plurality of class files with each corresponding class file within the plurality of corresponding class files.

In some embodiments, comparing the set of metadata fields within the class file with the set of metadata fields within the corresponding class file may include, for each metadata field within the set of metadata fields, (1) assigning a weight to the metadata field, (2) applying a similarity metric to the metadata field, and (3) applying the weight to a result of the similarity metric and including the weighted result in a summation of weighted results for the set of metadata fields. Additionally or alternatively, comparing the set of metadata fields within the class file with the set of metadata fields within the corresponding class file may include (1) identifying a functionality required by a threat family that includes the known malware package and (2) determining that the application package file may belong to the threat family based on determining that the application package file requests permission to access the functionality.

In one example, determining that the application package file is a threat variant in the same threat family as the known malware package may include determining that the similarity between the application package file and the known malware package exceeds a predetermined threshold. Additionally or alternatively, determining that the application package file is a threat variant in the same family as the known malware package may include determining that the similarity between the application package file and the known malware package exceeds a similarity between the application package file and an additional malware package of an additional threat family. In some examples, the computer-implemented method may also include performing a security action on the application package file in response to determining that the application package file is in the same threat family as the known malware package.

In one embodiment, a system for implementing the above-described method may include (1) an identification module programmed to identify an application package file including at least one class file, (2) an unpacking module programmed to identify a set of metadata fields within the class file, (3) a comparison module programmed to compare the set of metadata fields within the class file with a set of metadata fields within a corresponding class file found in a known malware package to determine a similarity between the application package file and the known malware package, and (4) a determination module programmed to determine, based on the similarity between the application package file and the known malware package, that the application package file is a threat variant in a same threat family as the known malware package. In some examples, the system may also include at least one processor configured to execute the identification module, the identification module, the unpacking module, the comparison module, and the determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify an application package file including at least one class file, (2) identify a set of metadata fields within the class file, (3) compare the set of metadata fields within the class file with a set of metadata fields within a corresponding class file found in a known malware package to determine a similarity between the application package file and the known malware package, and (4) determine, based on the similarity between the application package file and the known malware package, that the application package file is a threat variant in a same threat family as the known malware package.

As will be explained in greater detail below, by comparing class files in suspect application packages with class files in known malware families based on metadata stored in the class files, the systems and methods described herein may detect malware that has been repackaged in new application package files (e.g., because these systems and methods may check individual class files within application package files). In addition, these systems and methods may detect malware with altered strings and/or code sequences (e.g., because such changes may leave class file metadata fields intact). Furthermore, in some examples these systems and methods may reduce false positives during malware detection by seeking application package files within multiple apparently malicious class files instead of making a determination based on a single malware similarity detected in a single class file. Additionally, these systems and methods may detect malware more efficiently by only scanning and analyzing metadata fields of class files instead of the entirety of application package files.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
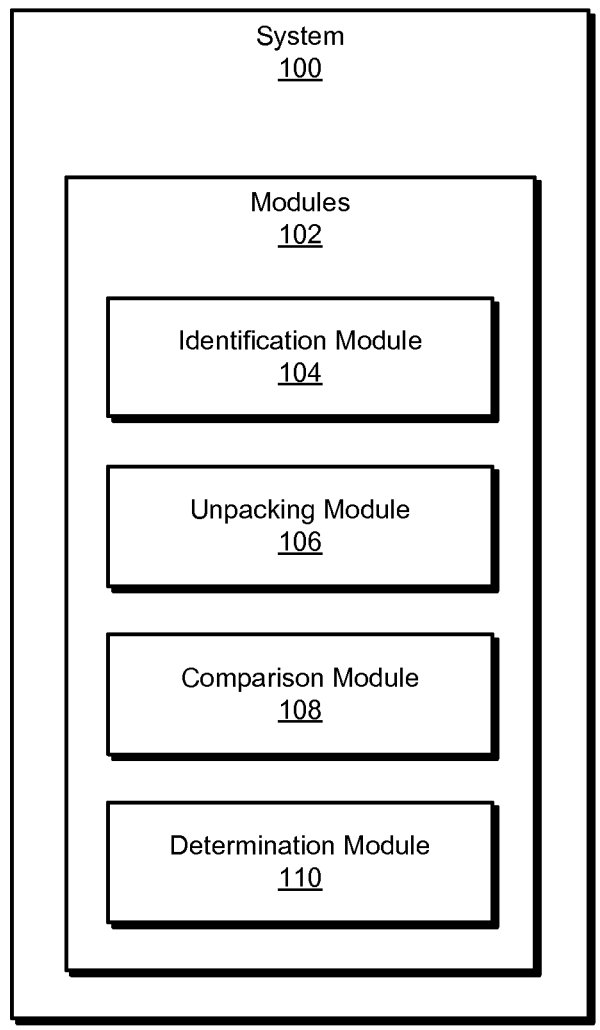
FIG. 1 is a block diagram of an exemplary system for detecting malware variants.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
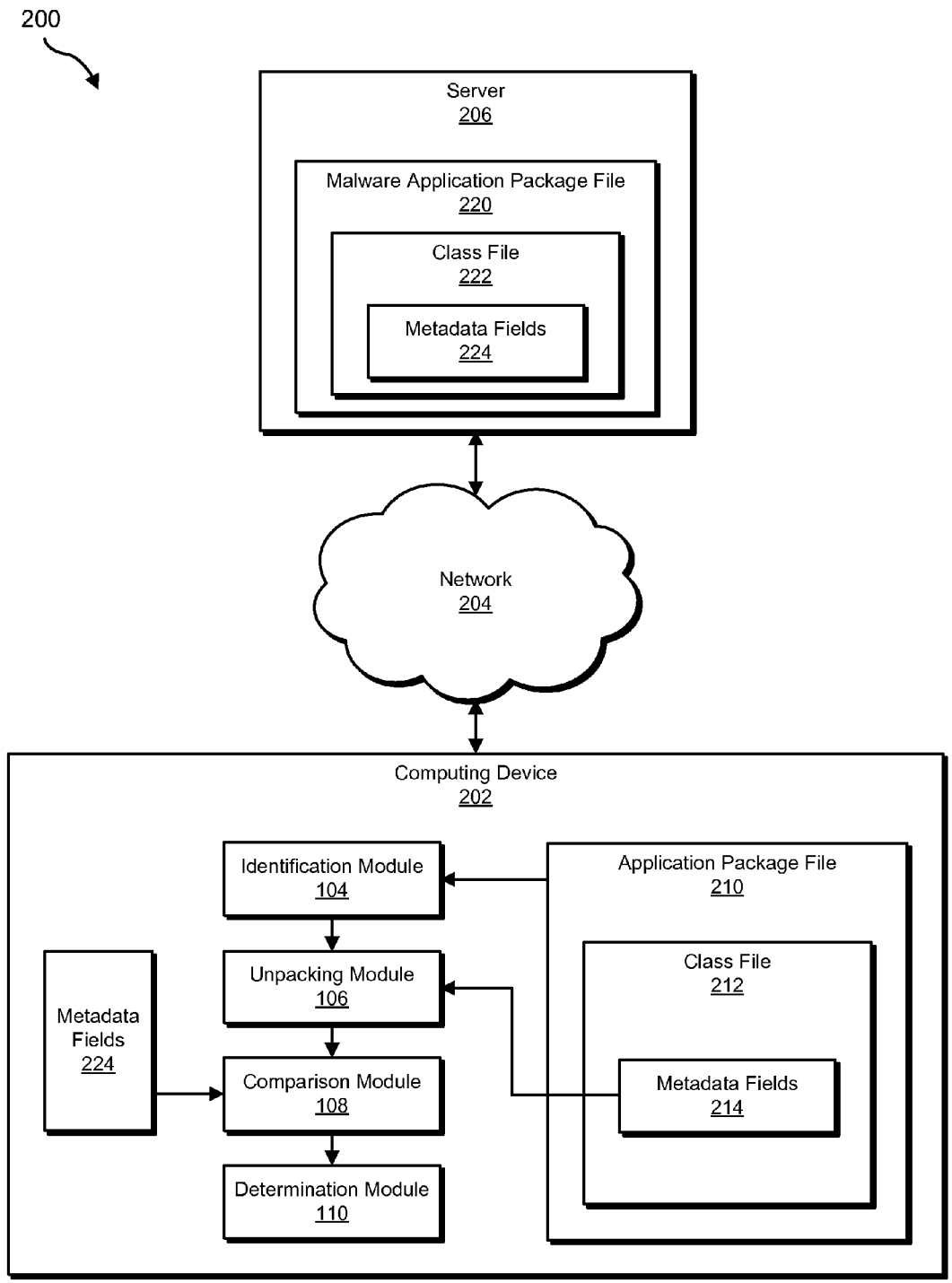
FIG. 2 is a block diagram of an exemplary system for detecting malware variants.
Figure 3:
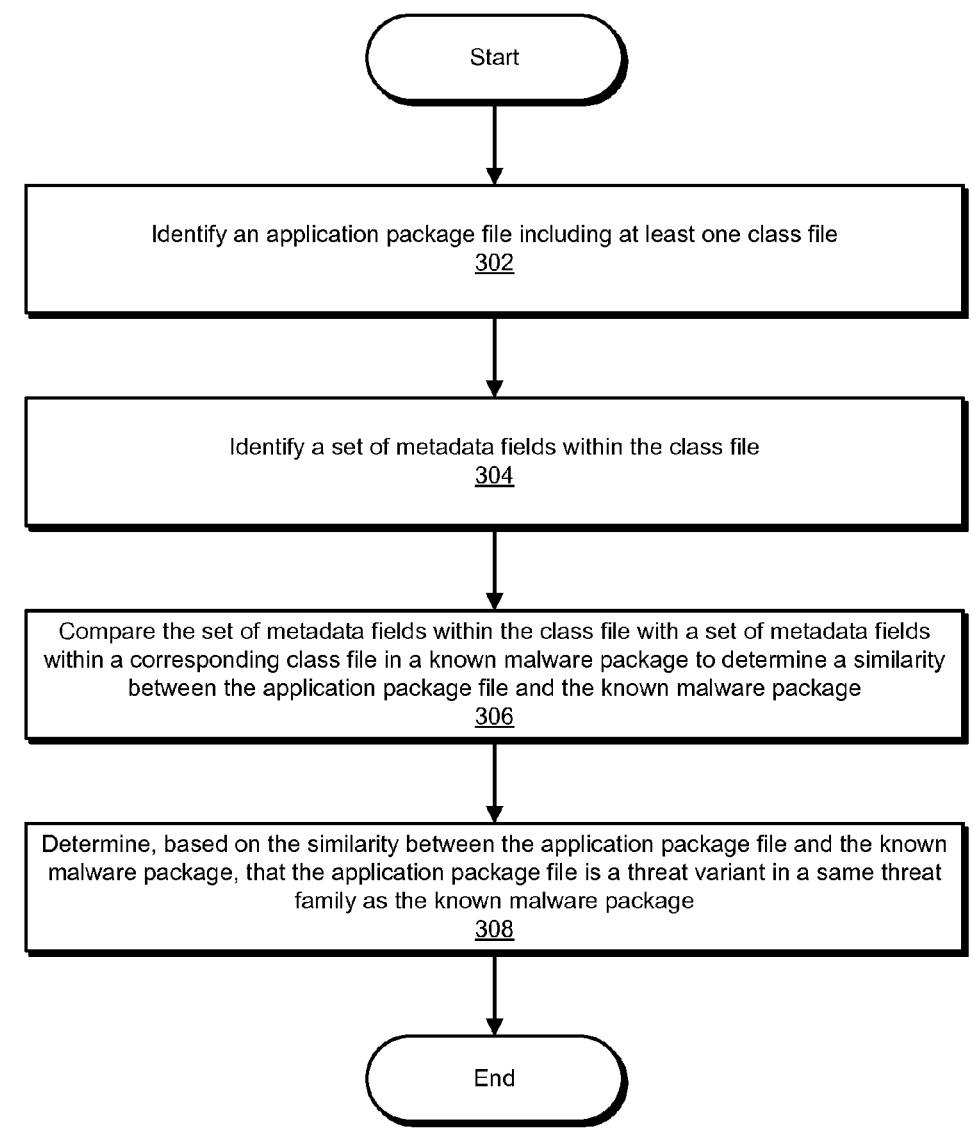
FIG. 3 is a flow diagram of an exemplary method for detecting malware variants.
Figure 4:
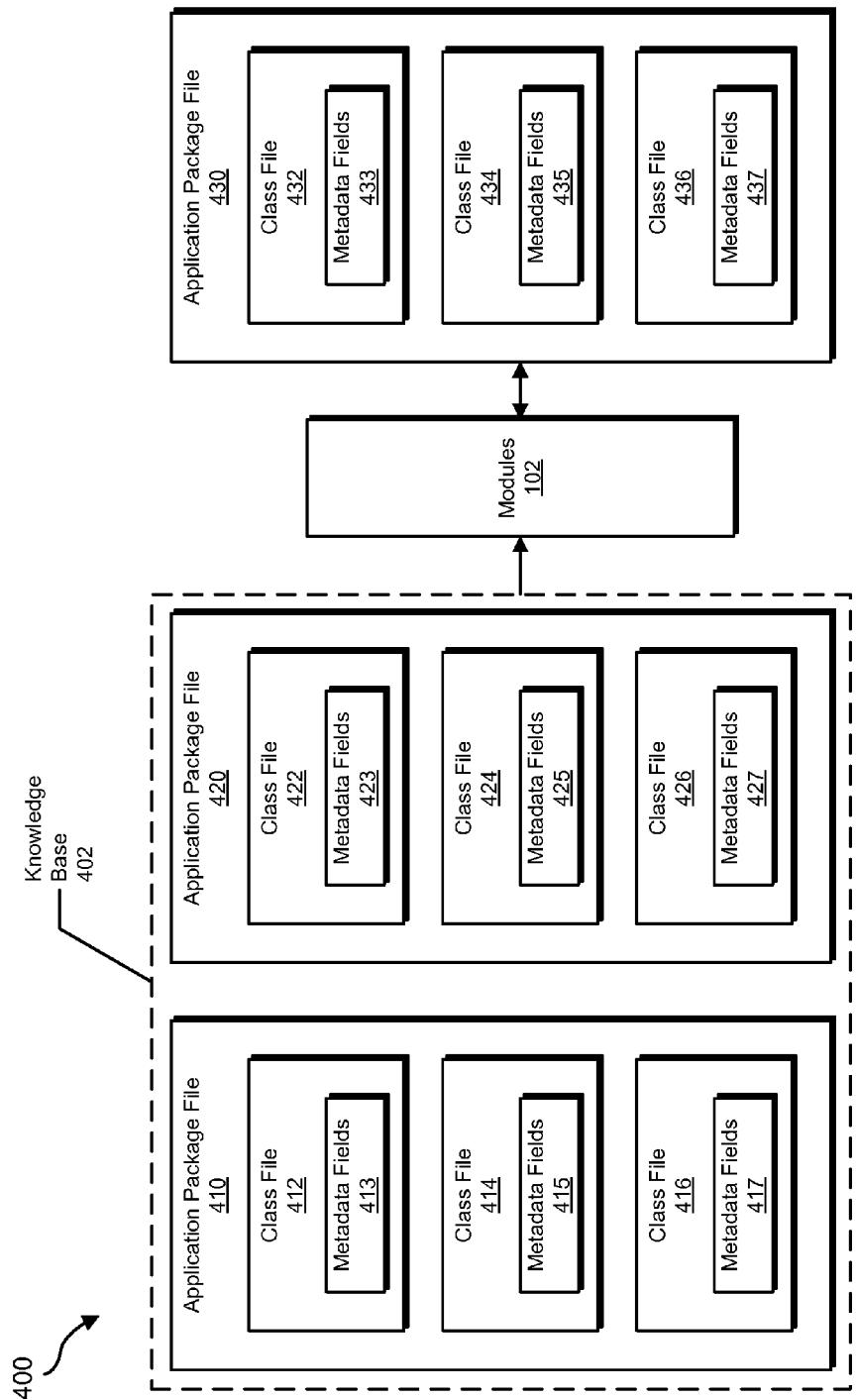
FIG. 4 is a block diagram of an exemplary system for detecting malware variants.

The following will provide, with reference to FIGS. 1, 2, and 4, detailed descriptions of exemplary systems for detecting malware variants. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting malware variants. As illustrated in this figure, exemplary system 100 may include one or more modules 102 for performing one or more tasks. For example, and as will be explained in greater detail below, exemplary system 100 may include an identification module 104 programmed to identify an application package file including at least one class file. Exemplary system 100 may also include an unpacking module 106 programmed to identify a set of metadata fields within the class file.

In addition, and as will be described in greater detail below, exemplary system 100 may include a comparison module 108 programmed to compare the set of metadata fields within the class file with a set of metadata fields within a corresponding class file found in a known malware package to determine a similarity between the application package file and the known malware package. Furthermore, exemplary system 100 may include a determination module 110 programmed to determine, based on the similarity between the application package file and the known malware package, that the application package file is a threat variant in a same threat family as the known malware package. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, facilitate computing device 202 in detecting malware variants. For example, and as will be described in greater detail below, one or more of modules 102 may cause computing device 202 to (1) identify an application package file (e.g., an application package file 210) including at least one class file (e.g., a class file 212), (2) identify a set of metadata fields within the class file (e.g., metadata fields 214), (3) compare the set of metadata fields within the class file (e.g., metadata fields 214 within class file 212) with a set of metadata fields within a corresponding class file (e.g., metadata fields 224 within a class file 222) found in a known malware package (e.g., a malware application package file 220) to determine a similarity between the application package file and the known malware package (e.g., to determine a similarity between application package file 210 and malware application package file 220), and (4) determine, based on the similarity between the application package file and the known malware package, that the application package file is a threat variant in a same threat family as the known malware package (e.g., determine, based on the similarity of application package file 210 and malware application package file 220, that application package file 210 is a threat variant within the same threat family as malware application package file 220).

Computing device 202 generally represents any type or form of computing device capable of reading computer-executable instructions. Examples of computing device 202 include, without limitation, cellular phones, tablet computing devices, e-book readers, personal digital assistants (PDAs), laptops, desktops, servers, multimedia players, embedded systems, combinations of one or more of the same, exemplary computing system 510 in FIG. 5, or any other suitable computing device.

Server 206 generally represents any type or form of computing device that is capable of storing, comparing, and/or providing data. Examples of server 206 include, without limitation, application servers and database servers configured to provide various database services and/or run certain software applications. For example, server 206 may represent a security server configured to provide anti-malware information for client devices (e.g., mobile computing devices).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for detecting malware variants. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an application package file including at least one class file. For example, at step 302 identification module 104 may, as part of computing device 202 in FIG. 2, identify application package file 210 including class file 212.

As used herein, the phrase "application package file" may refer to any file serving as a package and/or archive of one or more class files. In some examples, an application package file may also include one or more additional files (e.g., resource files, asset files, manifest files, and/or certificate files) useful for distributing and/or installing an application. An example of the application package file may include an ANDROID application package file ("APK").

As used herein, the phrase "class file" may refer to any file representing a compiled class (e.g., an object-oriented structure including one or more methods and/or data fields). In some examples, the class file may include bytecode (e.g., one or more instructions which may be interpreted, executed within a virtual machine, and/or compiled into machine code). In one example, the class file may include a Java class file.

Identification module 104 may identify the application package file in any of a variety of contexts. For example, identification module 104 may identify the application package file as recently downloaded (e.g., to a mobile computing device). Additionally or alternatively, identification module 104 may identify an attempt to install an application from the application package file (e.g., onto a mobile computing device). In some examples, identification module 104 may identify an attempt to retrieve the application package file (e.g., identification module 104 may operate on a security server and receive a message from a mobile computing device that a user has attempted to retrieve the application package file from a specified network location). Additionally or alternatively, identification module 104 may identify the application package file found while crawling a network (e.g., the Internet) for new and/or unrecognized application package files.

FIG. 4 illustrates an exemplary system 400 for detecting malware variants. As shown in FIG. 4, exemplary system 400 may include an application package file 430. Using FIG. 4 as an example, at step 302 identification module 104 may identify application package file 430 including class files 432, 434, and 436.

Returning to FIG. 3, at step 304 one or more of the systems described herein may identify a set of metadata fields within the class file. For example, at step 304 unpacking module 106 may, as part of computing device 202 in FIG. 2, identify metadata fields 214 within class file 212.

As used herein, the phrase "metadata field" may refer to any field stored within a class file as a part of a format of the class file which describes one or more properties of the class file. As used herein, the term "set" may refer to any grouping of one or more elements and/or members. In some examples, a set may include a single member.

Unpacking module 106 may identify the set of metadata fields in any of a variety of ways. For example, unpacking module 106 may extract the class file from the application package file. Additionally or alternatively, unpacking module 106 may identify the extracted class file from the application package file. In some examples, unpacking module 106 may parse the class file to identify the set of metadata fields. Additionally or alternatively, unpacking module 106 may read the class file from predetermined offsets to identify one or more metadata fields. In some examples, an offset for one metadata field may depend in part on the length of a second metadata field as specified in a third metadata field. Accordingly, in some examples, unpacking module 106 may determine an offset of a metadata field by adding the value of one or more additional metadata fields to a predetermined offset. In some examples, unpacking module 106 may only scan and/or parse a portion of the class file (e.g., a header portion containing metadata fields) and not the entire class file. Additionally or alternatively, unpacking module 106 may scan and/or parse the class file without decompiling the class file.

Unpacking module 106 may identify any of a variety of metadata fields. For example, unpacking module 106 may identify a number of constants in a constant pool of the class file. As used herein, the phrase "constant pool" may refer to any collection, list, array, table, and/or sequence of constants used in and/or defined for a class. For example, unpacking module 106 may identify, based on a format of the application package file, a predetermined offset of a constant pool count. Unpacking module 106 may then read from the application package file at the predetermined offset within the class file to identify the number of constants in the constant pool of the class file.

Similarly, in some examples, unpacking module 106 may identify a number of class types in the class file. In some examples, unpacking module 106 may identify a number of fields in the class file. For example, unpacking module 106 may identify a number of class variables and/or data members of the class. In some examples, unpacking module 106 may identify a number of methods in the class file. For example, unpacking module 106 may identify a count of how many methods are defined within the class. Additionally or alternatively, unpacking module 106 may identify a total length of the methods in the class file. For example, unpacking module 106 may identify a length of a method table storing all of the methods within the class. In some examples, unpacking module 106 may identify one or more method names of the methods within the class file. In these examples, unpacking module 106 may also identify a length of one or more of the method names in the class file. Unpacking module 106 may further identify an average length of method names in the class file (e.g., by calculating the average length based on the identified lengths of the method names).

Examples of metadata fields that unpacking module 106 may identify also include identifying a count of various data types used in the class. For example, unpacking module 106 may identify a count of fieldRef type data members and/or a count of utf-8 type data members. Additionally or alternatively, unpacking module 106 may identify a number of interface in the class (e.g., a number of entries in an interface table in the class file), a size of the largest method in the class file, a largest stack size of any method in the class file, a largest local variable count of any method in the class file, a number of attributes in the class file, a size of the largest attribute in the class file, a name of the class, a parent of the class, names of one or more super classes of the class, etc.

Using FIG. 4 as an example, at step 304 unpacking module 106 may identify metadata fields 433 of class file 432, metadata fields 435 of class file 434, and/or metadata fields 437 of class file 436.

Returning to FIG. 3, at step 306 one or more of the systems described herein may compare the set of metadata fields within the class file with a set of metadata fields within a corresponding class file found in a known malware package to determine a similarity between the application package file and the known malware package. For example, at step 306 comparison module 108 may, as part of computing device 202 in FIG. 2, compare metadata fields 214 within class file 212 with metadata fields 224 within a class file 222 in malware application package file 220 to determine a similarity between application package file 210 and malware application package file 220.

As used herein, the phrase "malware package" may refer to any malware that includes at least one class file. For example, the phrase "malware package" may refer to an application package file that includes one or more class files which, separately or jointly, constitute and/or are capable of creating and/or generating a virus, worm, Trojan horse, spyware, and/or any other malicious, illegitimate, and/or unauthorized software.

Comparison module 108 may compare the set of metadata fields within the class file with the set of metadata fields within the corresponding class file found in the known malware package in any of a variety of ways and with any of a variety of steps. In some examples, comparison module 108 may find the closest match for the class file in the known malware package. For example, comparison module 108 may determine that the corresponding class file corresponds to the class file by comparing the class file to each class file within the known malware package and then determine that the corresponding class file is more similar to the class file than any other class file within the known malware package. In some examples, comparison module 108 may determine that the corresponding class file corresponds to the class file by determining that the class file is a variant of and/or has the same functionality of the corresponding class file.

Using FIG. 4 as an example, system 400 may include a knowledge base 402 of known malicious application package files 410 and 420. Comparison module 108 may compare suspect application package file 430 with known malicious application package file 410 as a part of determining whether application package file 430 represents a malware variant within the same threat family as application package file 410. Accordingly, comparison module 108 may compare class file 432 of application package file 430 with each of class files 412, 414, and 416 in application package file 410. In this example, comparison module 108 may determine that class file 414 is most similar to class file 432 because metadata fields 433 are more similar to metadata fields 425 than to metadata fields 423 or 427.

In some examples, comparison module 108 may compare only some class files within the application package file with the malware package. For example, comparison module 108 may select a plurality of class files within the application package file to compare with a plurality of corresponding class files within the known malware package and compare the plurality of class files with the plurality of corresponding class files to determine the similarity of each class file within the plurality of class files with each corresponding class file within the plurality of corresponding class files. In these examples, comparison module 108 may select the plurality of class files using any suitable criteria. For example, comparison module 108 may select load point class files for comparison. In some examples, comparison module 108 may select a main class file and one or more class files closely connected to the main class file. In this manner, comparison module 108 may more efficiently compare the application package file with the malware package.

Using FIG. 4 as an example, comparison module 108 may select class file 432 and class file 436 of application package file 430 to compare with class files 412, 414, and 416 of application package file 410. In one example, comparison module 108 may compare class file 432 with class files 412, 414, and 416 and determine that class file 414 corresponds with class file 432. In this example, comparison module 108 may also compare class file 436 with class files 412, 414, and 416 and determine that class file 412 corresponds with class file 436.

In some examples, comparison module 108 may weight the set of metadata fields for comparison. For example, comparison module 108 may, for each metadata field within the set of metadata fields, assign a weight to the metadata field, apply a similarity metric to the metadata field, apply the weight to a result of the similarity metric, and include the weighted result in a summation of weighted results for the set of metadata fields. For example, comparison module 108 may apply the weight of each metadata field according to a multiplier of an arithmetic difference between the metadata field and the corresponding metadata field in the corresponding class file of the malware package. In this manner, comparison module 108 may assign the appropriate importance to the respective metadata fields and/or translate the results of the similarity metric for each metadata field to an appropriate scale.

In some examples, comparison module 108 may filter out malware packages to compare to the application package file in order to selectively compare the application package file to malware packages to which the application package file may be related. For example, comparison module 108 may identify a functionality required by a threat family that includes the known malware package and determine that the application package file may belong to the threat family based on determining that the application package file requests permission to access the functionality. Comparison module 108 may identify the functionality in any suitable manner. For example, comparison module 108 may identify the functionality by identifying the permission required to access the functionality. In some examples, comparison module 108 may identify the functionality by identifying metadata in the malware package (e.g., in a manifest file of the malware package) signifying a requirement for and/or a request to access the functionality (e.g., as a part of and/or subsequent to an installation of a corresponding application from the malware package). The permission may include any suitable privilege, permission, right, and/or access level. Likewise, the functionality may include any functionality which may facilitate malware operation (e.g., to self-propagate, to obfuscate and/or obfuscate its existence, and/or to take illicit control of a device and/or cause unwanted behaviors on the device). For example, a malware package may belong to a malware family called "Android.FakePlayer". The malware package may send unwanted short message service ("SMS") messages as a part of its malicious behavior. Accordingly, comparison module 108 may first determine that the application package file is configured to request SMS functionality and/or one or more permissions required for SMS functionality before comparing the class file of the application package file with any class files of the malware package. Examples of other functionality and/or permissions that comparison module 108 may use for filtering include, without limitation, access to information about networks (e.g., Wi-Fi networks), the ability to disable a device, the ability to modify a configuration and/or system settings, an ability to execute with root and/or administrative privileges, an ability to install packages, an ability to read personal profile data, an ability to write to external storage, etc.

Using FIG. 4 as an example, comparison module 108 may determine that application package 410 requests permission to send SMS messages and to read personal profile data as a part of its threat family exploits. Comparison module 108 may also determine that application package file 420 requests permission to modify system settings and to write to external storage as a part of its threat family exploits. Comparison module 108 may additionally determine that application package file 430 requests permission to send SMS messages, read personal profile data, and write to external storage, but that application package file 430 does not request permission to modify system settings. Accordingly, comparison module 108 may determine that application package file 430 may belong to the same threat family as application package file 410, and may therefore compare one or more of class files 432, 434, and 436 with one or more of class files 412, 414, and 414. Similarly, comparison module 108 may determine that application package file 430 does not belong to the same threat family as application package file 420, and therefore comparison module 108 may not compare the class files of application package file 430 with the class files of application package file 420.

Comparison module 108 may use any appropriate algorithms and/or formulas for checking the application package file against threat families and/or calculating the distance of any two class files. For example, comparison module 108 may calculate how similar the class file is to the corresponding class file using the formula:

$$C = 1 - \frac{\sum_{i=0}^{i=n} D_i * W_i}{\sum_{i=0}^{i=n} W_i}$$

where C is how similar the class file is to the corresponding class file, n is the number of metadata fields in the set of metadata fields, Di is the distance between metadata field i of the class file and metadata field i of the corresponding class file, and Wi is the weight assigned to metadata field i.

Returning to FIG. 3, at step 308 one or more of the systems described herein may determine, based on the similarity between the application package file and the known malware package, that the application package file is a threat variant in a same threat family as the known malware package. For example, at step 308 determination module 110 may, as part of computing device 202 in FIG. 2, determine, based on the similarity of application package file 210 and malware application package file 220, that application package file 210 is a threat variant within the same threat family as malware application package file 220.

As used herein, the phrase "threat family" may refer to any categorization of malware samples and/or variants that share similar features, characteristics, functions, and/or exploits. Additionally or alternatively, the phrase "threat family" may refer to any categorization of malware samples that are related in origin and/or development (e.g., one malware sample being derived from another malware sample). As used herein, the phrase "threat variant" may refer to any distinct member of a threat family and/or distinct subclass of a threat family.

Determination module 110 may determine that the application package file is a threat variant in the same threat family as the known malware package in any of a variety of ways. For example, determination module 110 may determine that the similarity between the application package file and the known malware package exceeds a predetermined threshold. Additionally or alternatively, determination module 110 may determine that the similarity between the application package file and the known malware package exceeds a similarity between the application package file and an additional malware package of an additional threat family. In this example, determination module 110 may compare (and/or instruct comparison module 108 to compare) the application package file with a plurality of threat families (e.g., stored in a knowledge base of threat families).

Exemplary pseudocode illustrating how determination module 110 may compare the application package file to a knowledge base of malware families is shown in Table 1.

TABLE 1 for m in threat families [1...M] in knowledge base
{
    for n in members [1...N] inside threat family[m]
    {
        if package passes filters check of member[n]
        {

TABLE 1-continued

```
    for j in class files [1...J] inside member[n]
    {
        for k in class files [1...K] inside the package
            calculate C_file[j,k] for file j and file k
        C_file[j] = Max(C_file[j,k])
        }
        C_member[m,n] = Avg(C_file[j])
        if C_member[m,n] > Threshold.Sure
            set detection name to Sure.FamilyName and return
        else if C_member[m,n] > Threshold.Suspicious
            record C_member[m,n] and related family name for later use
    }
  }
}
If recorded C_member[m,n] is not empty
    FamilyName = Max(C_member[m,n]).FamilyName
    set detection name to Suspicious.FamilyName and return
else
    set not identified as threats variant and return
```

As shown in Table 1, determination module 110 may loop through the threat families stored in a knowledge base and through each member of each threat family. Determination module 110 may then perform a filter pass on the application package file to determine whether the application package file could be a variant of the selected threat family member (e.g., by checking that application package file has the permissions required by the threat family member). If the application package file passes the filter, determination module 110 may loop through the class files of the threat family member to compare (and/or instruct comparison module 108 to compare) the iterated threat family member class file with each class file in the application package file (e.g., using the closeness formula provided earlier). Determination module 110 may then select the closest class file within the application package file as representative of the closeness of the class file. Determination module 110 may then calculate a composite closeness of the class files of the application package file to the class files of the selected threat family member (e.g., by averaging the closeness of the respective class files). Determination module 110 may then check to see if the composite closeness exceeds a predetermined threshold and, if so, determine that the application package file is also member of the threat family. If not, determination module 110 may check to see if the composite closeness exceeds a threshold for suspicion, and, if so, record the suspicion (e.g., the closeness and the threat family). If the application package file demonstrated no certain match with any threat family but determination module 110 marked one or more threat families as suspiciously similar to the application package file, determination module 110 may determine that the application package file is most likely a member of the threat family of the most similar threat family member.

In some examples, determination module 110 may also perform a security action on the application package file in response to determining that the application package file is in the same threat family as the known malware package. For example, determination module 110 may delete the application package file, quarantine the application package file, save a sample of the application package file, send a notification to a security system of a location of application package file, restrict permissions for the application package file, prevent installation of an application from the application package file, and/or warn a user and/or administrator of the application package file. In some examples, determination module 110 may update a knowledge base of threat families with the application package file (e.g., identifying the application package file as a threat variant within the threat family).

As explained above, by comparing class files in suspect application packages with class files in known malware families based on metadata stored in the class files, the systems and methods described herein may detect malware that has been repackaged in new application package files (e.g., because these systems and methods may check individual class files within application package files). In addition, these systems and methods may detect malware with altered strings and/or code sequences (e.g., because such changes may leave class file metadata fields intact). Furthermore, in some examples these systems and methods may reduce false positives during malware detection by seeking application package files within multiple apparently malicious class files instead of making a determination based on a single malware similarity detected in a single class file. Additionally, these systems and methods may detect malware more efficiently by only scanning and analyzing metadata fields of class files instead of the entirety of application package files.

Figure 5:
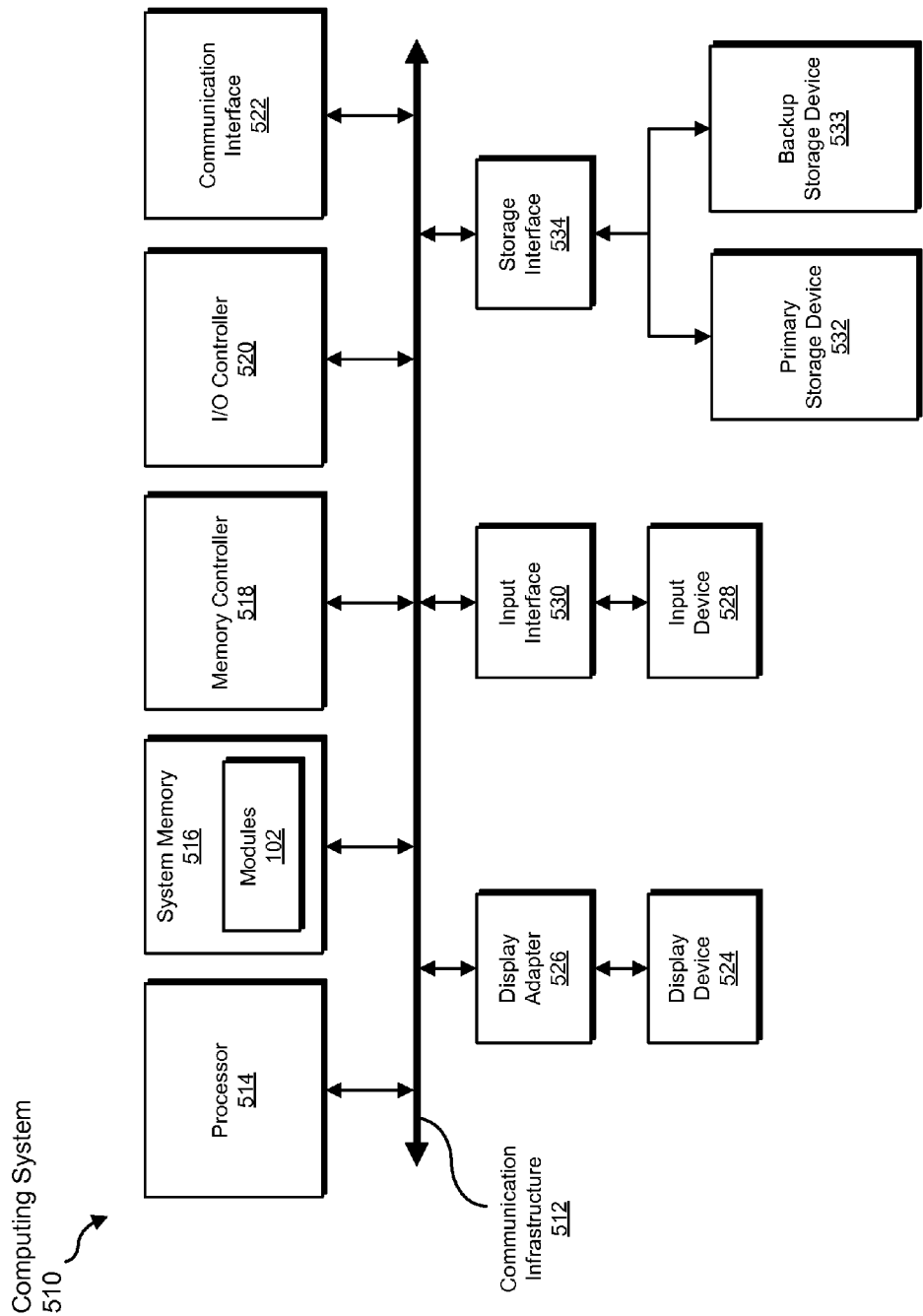
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, comparing, determining, selecting, assigning, applying, and/or performing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
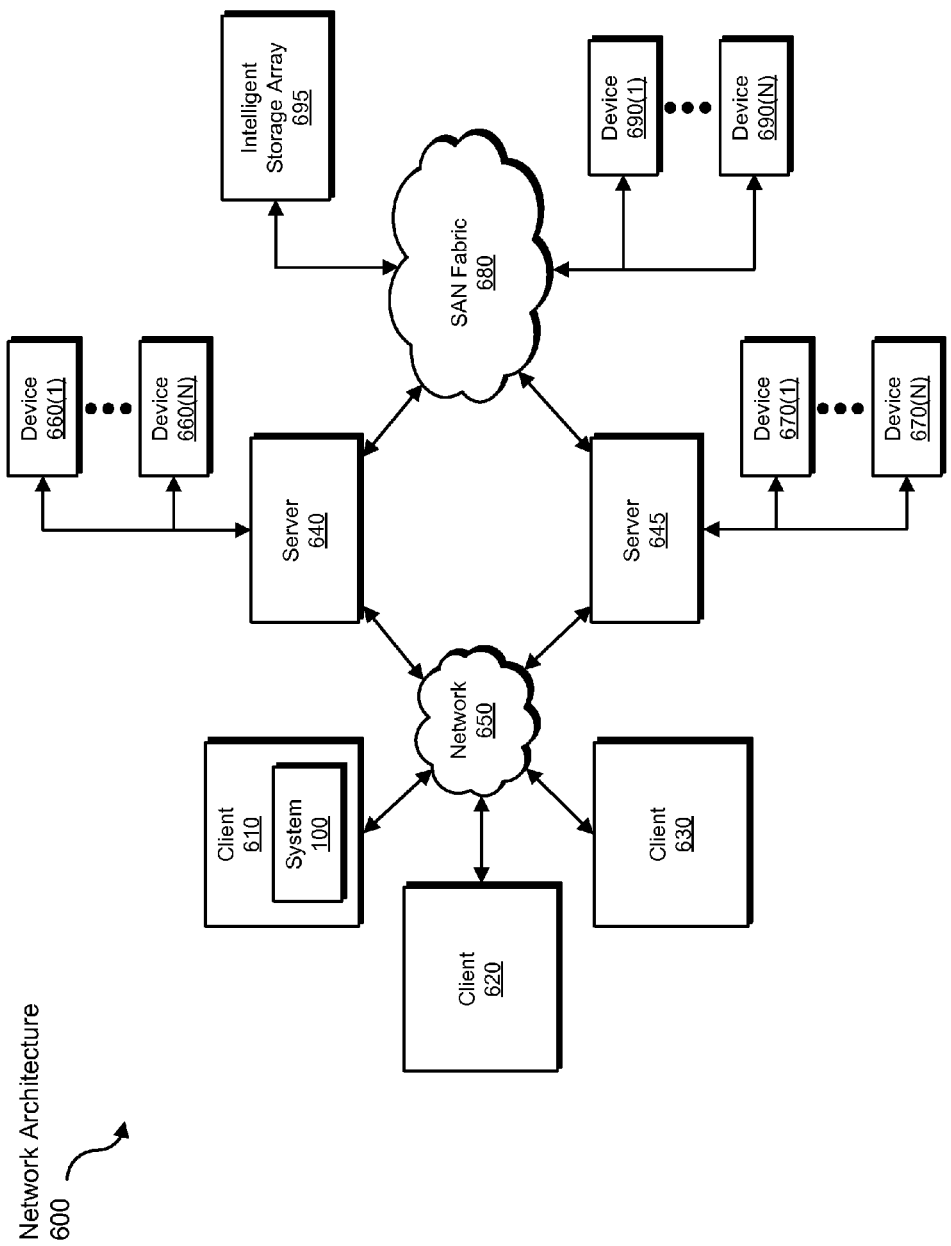
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, comparing, determining, selecting, assigning, applying, and/or performing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting malware variants.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for detecting malware variants.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting malware variants, the method comprising:
    identifying an application package file comprising at least one class file;
    extracting a set of metadata fields stored within the class file from the class file;
    comparing the set of metadata fields stored within the class file with the set of metadata fields stored within a corresponding class file found in a known malware package to determine a similarity between the application package file and the known malware package by:
        for each metadata field within the set of metadata fields:
            assigning a weight to the metadata field;
            applying a similarity metric to the metadata field;
            applying the weight to a result of the similarity metric and including the weighted result in a summation of weighted results for the set of metadata fields;
    determining, based on the similarity between the application package file and the known malware package, that the application package file is a threat variant in a same threat family as the known malware package;
    wherein the method is performed by a computing device comprising at least one processor.

2. The computer-implemented method of claim 1, wherein comparing the set of metadata fields stored within the class file with the set of metadata fields stored within the corresponding class file comprises:
    determining that the corresponding class file corresponds to the class file by comparing the class file to each class file within the known malware package;
    determining that the corresponding class file is more similar to the class file than any other class file within the known malware package.

3. The computer-implemented method of claim 1, wherein determining the similarity between the application package file and the known malware package further comprises:
    selecting a plurality of class files within the application package file to compare with a plurality of corresponding class files within the known malware package;
    comparing the plurality of class files with the plurality of corresponding class files to determine the similarity of each class file within the plurality of class files with each corresponding class file within the plurality of corresponding class files.

4. The computer-implemented method of claim 1, wherein determining, based on the similarity between the application package file and the known malware package, that the application package file is the threat variant within the same threat family as the known malware package comprises determining that the similarity between the application package file and the known malware package exceeds a predetermined threshold.

5. The computer-implemented method of claim 1, wherein determining, based on the similarity between the application package file and the known malware package, that the application package file is the threat variant within the same threat family as the known malware package comprises determining that the similarity between the application package file and the known malware package exceeds a similarity between the application package file and an additional malware package of an additional threat family.

6. The computer-implemented method of claim 1, wherein comparing the set of metadata fields stored within the class file with the set of metadata fields stored within the corresponding class file found in the known malware package to determine the similarity between the application package file and the known malware package comprises filtering out known packages to compare to the application package file in order to selectively compare the application package file to malware packages to which the application package file is potentially related.

7. The computer-implemented method of claim 1, wherein comparing the set of metadata fields stored within the class file with the set of metadata fields stored within the corresponding class file found in the known malware package to determine the similarity between the application package file and the known malware package comprises:
    identifying a functionality required by a threat family that includes the known malware package;
    determining that the application package file may belong to the threat family based on determining that the application package file requests permission to access the functionality.

8. The computer-implemented method of claim 1, wherein extracting the set of metadata fields stored within the class file from the class file comprises identifying a number of constants in a constant pool of the class file.

9. The computer-implemented method of claim 1, wherein extracting the set of metadata fields stored within the class file from the class file comprises identifying at least one of:
    a size of the class file;
    a number of class types in the class file;
    a number of fields in the class file;
    a number of methods in the class file;
    a total length of the methods in the class file;
    an average length of method names in the class file.

10. The computer-implemented method of claim 1, further comprising performing a security action on the application package file in response to determining that the application package file is in the same threat family as the known malware package.

11. A system for detecting malware variants, the system comprising:
    an identification module programmed to identify an application package file comprising at least one class file;
    an unpacking module programmed to extract a set of metadata fields stored within the class file from the class file;
    a comparison module programmed to compare the set of metadata fields stored within the class file with the set of metadata fields stored within a corresponding class file found in a known malware package to determine a similarity between the application package file and the known malware package by:

for each metadata field within the set of metadata fields:
assigning a weight to the metadata field;
applying a similarity metric to the metadata field;
applying the weight to a result of the similarity metric and including the weighted result in a summation of weighted results for the set of metadata fields;
a determination module programmed to determine, based on the similarity between the application package file and the known malware package, that the application package file is a threat variant in a same threat family as the known malware package;
at least one processor configured to execute the identification module, the unpacking module, the comparison module, and the determination module.

12. The system of claim 11, wherein the comparison module is programmed to compare the set of metadata fields stored within the class file with the set of metadata fields stored within the corresponding class file by:
determining that the corresponding class file corresponds to the class file by comparing the class file to each class file within the known malware package;
determining that the corresponding class file is more similar to the class file than any other class file within the known malware package.

13. The system of claim 11, wherein the determination module is further programmed to determine the similarity between the application package file and the known malware package by:
selecting a plurality of class files within the application package file to compare with a plurality of corresponding class files within the known malware package;
comparing the plurality of class files with the plurality of corresponding class files to determine the similarity of each class file within the plurality of class files with each corresponding class file within the plurality of corresponding class files.

14. The system of claim 11, wherein the determination module is programmed to determine, based on the similarity between the application package file and the known malware package, that the application package file is the threat variant within the same threat family as the known malware package by determining that the similarity between the application package file and the known malware package exceeds a predetermined threshold.

15. The system of claim 11, wherein the determination module is programmed to determine, based on the similarity between the application package file and the known malware package, that the application package file is the threat variant within the same threat family as the known malware package by determining that the similarity between the application package file and the known malware package exceeds a similarity between the application package file and an additional malware package of an additional threat family.

16. The system of claim 11, wherein the comparison module is programmed to compare the set of metadata fields stored within the class file with the set of metadata fields stored within the corresponding class file found in the known malware package to determine the similarity between the application package file and the known malware package by filtering out known malware packages to compare to the application package file in order to selectively compare the application package file to malware packages to which the application package file may be related.

17. The system of claim 11, wherein the comparison module is programmed to compare the set of metadata fields stored within the class file with the set of metadata fields stored within the corresponding class file found in the known malware package to determine the similarity between the application package file and the known malware package by:
identifying a functionality required by a threat family that includes the known malware package;
determining that the application package file may belong to the threat family based on determining that the application package file requests permission to access the functionality.

18. The system of claim 11, wherein the unpacking module is programmed to extract the set of metadata fields stored within the class file from the class file by identifying a number of constants in a constant pool of the class file.

19. The system of claim 11, wherein the unpacking module is programmed to extract the set of metadata fields stored within the class file from the class file by identifying at least one of:
a size of the class file;
a number of class types in the class file;
a number of fields in the class file;
a number of methods in the class file;
a total length of the methods in the class file;
an average length of method names in the class file.

20. A non-transitory computer-readable-storage medium comprising one or more computer-executable instructions that, when executed by at least one processor of a computing device, cause the computing device to:
identify an application package file comprising at least one class file;
extract a set of metadata fields stored within the class file from the class file;
compare the set of metadata fields stored within the class file with the set of metadata fields stored within a corresponding class file found in a known malware package to determine a similarity between the application package file and the known malware package by:
for each metadata field within the set of metadata fields:
assigning a weight to the metadata field;
applying a similarity metric to the metadata field;
applying the weight to a result of the similarity metric and including the weighted result in a summation of weighted results for the set of metadata fields;
determine, based on the similarity between the application package file and the known malware package, that the application package file is a threat variant in a same threat family as the known malware package.

* * * * *